250-203.K 56 CROSS REFERENCE EXAMINER

Nov. 22, 1966 K. CLUNIS 3,287,563

SPATIAL COHERENT REPRODUCING SYSTEM

Filed Nov. 7, 1962 2 Sheets-Sheet 1

INVENTOR:
Kenneth Clunis

By Smyth, Roston & Pavitt
Attorneys

Nov. 22, 1966 K. CLUNIS 3,287,563

SPATIAL COHERENT REPRODUCING SYSTEM

Filed Nov. 7, 1962 2 Sheets-Sheet 2

INVENTOR
Kenneth Clunis
By Smyth, Roston & Pavitt
Attorneys

United States Patent Office 3,287,563

Patented Nov. 22, 1966

3,287,563

SPATIAL COHERENT REPRODUCING SYSTEM

Kenneth Clunis, Manhattan Beach, Calif., assignor to Minnesota Mining and Manufacturing Company, St. Paul, Minn., a corporation of Delaware Filed Nov. 7, 1962, Ser. No. 236,027
15 Claims. (Cl. 250—219)

This invention relates to a transducing system. More specifically, the invention relates to the recording and reproduction of information on a thermoplastic medium.

In the prior art, systems have been designed to record information on a thermoplastic medium by the use of an electron beam. The recording is accomplished by directing the electron beam toward the thermoplastic medium to lay down a charge pattern on the surface of the medium in accordance with the information. The medium is then heated so that the thermoplastic medium assumes a plastic state. During the plastic state the surface of the medium deforms in accordance with the charge pattern due to the surface tensions produced by the charge pattern. The medium therefore contains a pattern of physical deformities on the surface of the medium having characteristics in accordance with the information.

The systems of the prior art have used standard optical techniques to reproduce the information recorded on the thermoplastic medium. For example, the systems of the prior art have used schlieren optical systems to reproduce the information. The systems operate by directing light through a plurality of slits toward the surface of the medium. If the medium is blank the light passes through without being modified. A plurality of bars or stops are then disposed to block the light. If, however, the medium contains information in the form of surface deformities, the light is diffracted and passes to the side of the bars or stops. Output means such as a photocell are used to detect the information.

The prior art systems have worked fairly successfully, but a great degree of care and skill is required to insure a proper displacement of the various components when using schlieren optics for the reproducing systems. Also, any movement of the medium in a direction between the plurality of slits and the bars or stops disturbs the positioning of the light as it leaves the medium. This can produce false information since more or less light energy can pass the bars or stops if the medium moves. The reproducing system of the present invention can tolerate movements of the medium without destroying the significance of the information since it does not use the slits and bars of the prior art reproducing systems.

This invention discloses a reprdoucing system which does not use schlieren optics and eliminates some of the difficulties encountered by the systems of the prior art. For example, the reproducing system of the present invention incorporates a light source which emits light having a plurality of wave fronts with the energy in each wave front in phase so that the light energy has special coherence. The light energy is then directed toward the thermoplastic medium to be modified by the physical deformities on the surface of the medium. The reproducing system of the present in vention may, for example, use a laser to produce light having the above characteristics. The system eliminates the use of schlieren optics with their attendant problems discussed above.

The information may be recorded on the medium in direct representation of the information and a reproduction may be effected by directing the modified light energy to a screen. Also, the information may be recorded on the medium on a digital basis and light emitted from a laser may be directed through the thermoplastic medium to modify the light energy in accordance with the digital variations of the light energy. A photosensitive means is then used to produce an electrical signal having values in accordance with the characteristics of the light energy. Finally, the electrical signal may be used to reproduce the information.

The invention also incorporates means to control the tracking of the light energy during reproduction. For example, the laser may direct light energy toward a thermoplastic disc which has been recorded along a spiral track. The disc is rotated and moved in a transverse direction in order to have the light energy follow the spiral track on the disc. The light energy is then reflected off of a mirror surface included in a galvanometer structure and applied as an input to a microscope. The light energy passes through the microscope to appear in a magnified condition as an optical representation of the light energy on an output face included in the microscope. A screen is disposed on the output face of the microscope and the screen contains two slits to split up the optical representation of the light energy into two compounds. A pair of photocells are then displaced in front of the two slits to detect the optical representation. The sum of the outputs from the photocells provides an output signal which has characteristics in accordance with the characteristics of the light energy. The difference of the outputs from the pair of photocells is used as a control signal to regulate the position of the galvanometer and therefore the mirror included in the galvanometer is moved to compensate for any eccentricities in the rotation of the disc.

The invention is more clearly illustrated with reference to the following figures, wherein.

Figures 1, 2:
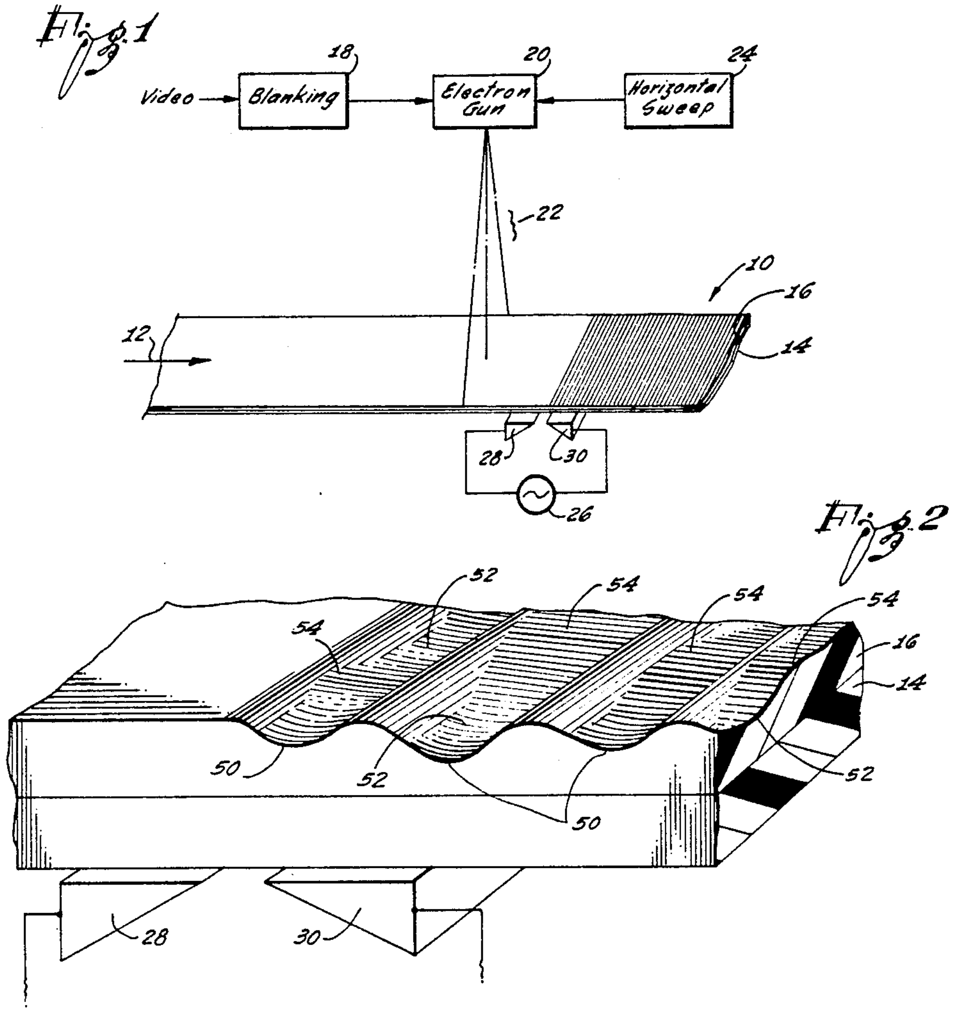
FIGURE 1 is a block digaram of a recording system for a thermoplastic tape.
FIGURE 2 is a fragmentary view of a portion of the tape of FIGURE 1 recorded with the system of FIGURE 1.

In FIGURE 1 a thermoplastic tape medium 10 is moved in a longitudinal direction, as indicated by the arrow 12, by a conventional tape transport (not shown). The tape medium 10 includes a base 14 which is composed of an inert plastic material. The base 14 has disposed on it a layer of thermoplastic material 16. The information, for example video information, is applied to circuitry 18 to control the blanking of the signal during certain periods of time. The information then passes to an electron gun 20 to control the intensity of an electron beam 22 produced by the electron gun. The electron gun 20 is also controlled to sweep the beam 22 across the tape 10 by a horizontal sweep generator 24.

The electron beam 22, therefore, sweeps transversely across the tape as the tape moves in a longitudinal direction to record on the tape in a series of adjacent transverse tracks. During the retrace of the electron beam the circuitry 18 blanks out the electron beam so that there is no false recording during this time. The information is recorded on the thermoplastic material 16 by having the electron beam lay down a charge pattern on the surface of the thermoplastic material with the intensities of the charge pattern in accordance with the information supplied to the electron gun. The charge pattern produces a corresponding stress pattern on the surface of the thermoplastic material.

The information is then permanently stored in the thermoplastic medium by the use of heat. This heat is provided by a radio frequency generator 26 coupled across a pair of capacitor plates 28 and 30. The radio frequency energy which appears across the plates 28 and 30 has a path through thermoplastic tape 10. When the thermoplastic material passes by the plates 28 and 30 a sufficient quantity of heat is produced in the thermoplastic material by the radio frequency energy so that the material 16 enters a plastic state. With the material 16 in the plastic state the surface is now allowed to deform to equalize the stresses present on the surface of the material. A deformed physical pattern is therefore produced on the surface of the material 16 in accordance with the information.

FIGURE 2 is a fragmentary view of the surface of the thermoplastic tape 10 recorded in accordance with the system of FIGURE 1. As will be noted, the thermoplastic material 16 has physical deformities on its surface. The physical deformities are shown as a series of grooves 50 disposed transversely across the tape 10. The grooves 50 have low and high areas which are designated by the reference characters 52 and 54, respectively. The low and high areas represent the variations in the information which has been recorded on the thermoplastic material 16.

In the reproducing system of FIGURE 3 the tape 10 is again moved in a longitudinal direction as indicated by the arrow 100 by a tape transport (not shown). A source of light 102 directs light energy toward the tape 10. The source of light preferably is a laser. This type of light source has characteristics of producing energy essentially at a single frequency and having all the light energy in phase. That is, the light energy produced by the laser 102 essentially has spacial coherence.

The light energy strikes the tape 10 over an area of the tape 10 which can represent one unit of the information. For example, the information may be recorded on the thermoplastic tape 10 at successive adjacent areas to represent individual frames of a video signal. The laser, therefore, may be modulated by a modulator 104 so that the light energy strikes the tape 10 at successive periods of time which correspond to the frame frequency of the video information. The light energy is then varied in accordance with the surface deformities of the thermoplastic material 16.

For example, the light energy produced by the laser 102 may be represented as a series of wave fronts 108 with each wave front parallel to all the other wave fronts. The light energy strikes the tape at progressive positions along the tape 10 and the diffraction of the light energy is in accordance with the surface deformities on the tape 10. The wave fronts at the successive positions either add to or cancel each other to produce a variable intensity light signal as indicated at 110. The light energy is then presented as an optical representation by a screen 112. The screen 112 reflects the light with variable intensities at different positions on the screen in accordance with the surface deformities on the thermoplastic material 16.

Figure 3:
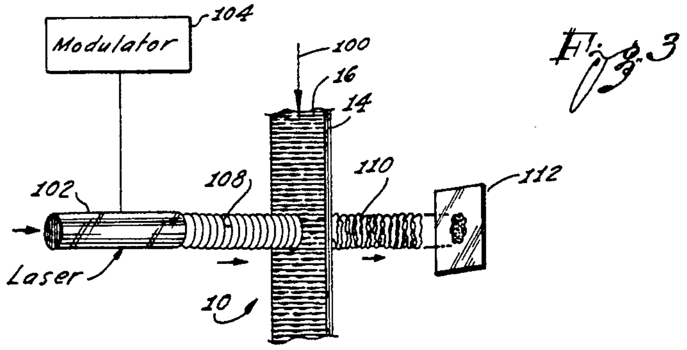
FIGURE 3 is a block diagram of a reproducing system in accordance with the concepts of this invention for reproducing information recorded by the system of FIGURE 1.

It will be noted that the reproducing system illustrated in FIGURE 3 does not use the schlieren optical systems of the prior art and, accordingly, the position of the tape 10 between the laser 102 and the screen 112 is not critical. For example, the tape 10 may vary closer or further away from the laser 102 without affecting the visual signal presented on the surface of the screen 112. This advantage is obtained since the reproduction of the information does not depend on the diffraction of light to the side of bars or stops.

Figure 4:
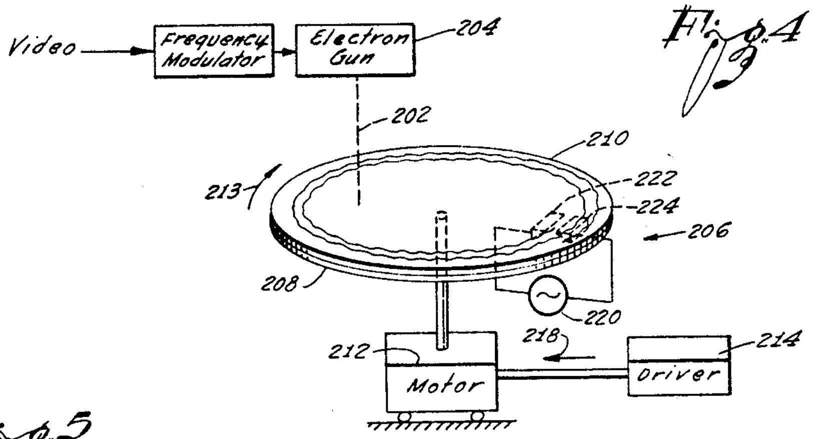
FIGURE 4 is an alternate system for use in recording information on a thermoplastic disc.

FIGURE 4 illustrates a second embodiment of the invention using a thermoplastic disc medium recorded on a digital basis. In FIGURE 4 an information signal, for example a video signal, is applied to a frequency modulator 200. The output signal from the frequency modulator 200 controls an electron beam 202 produced by an electron gun 204. The frequency modulator, for example, can control the electron gun to produce a plurality of pulse outputs wherein the frequency rate of the pulses corresponds to the amplitude of the information.

The electron beam 202 produced by the electron gun 204 is directed to strike the surface of a thermoplastic disc medium 206. The disc medium 206 is composed of an inert translucent base 208 covered on one surface by a thermoplastic material 210. The disc 206 is rotated by a motor 212 at a particular speed in a direction indicated by the arrow 213. The motor 212 is also coupled to a driver 214 through a shaft 216. The driver 214 produces a transverse motion of the motor 212 as indicated by the arrow 218. Since the motor 212 is linked to the disc 206 by a shaft, the entire structure of the disc, shaft and motor is moved in the transverse direction by the driver 214. Therefore, the disc rotates and moves in a transverse direction to have the electron beam 202 strike the thermoplastic surface 210 of the disc 206 along a spiral path.

The beam 202 produces a charge pattern on the surface of the thermoplastic material in accordance with the characteristics of the information. The thermoplastic material is then subjected to heat energy produced by a radio frequency generator 220. The output energy produced by the generator 220 is supplied across a pair of capacitance plates 222 and 224 to produce a localized heating in the thermoplastic material 210. When the material 210 enters its plastic state it becomes deformed in accordance with the charge pattern so as to equalize the physical stresses produced by the charges. The material then cools so that the surface of the thermoplastic 210 has physical deformities in accordance with the information.

Figures 5, 6, 7:
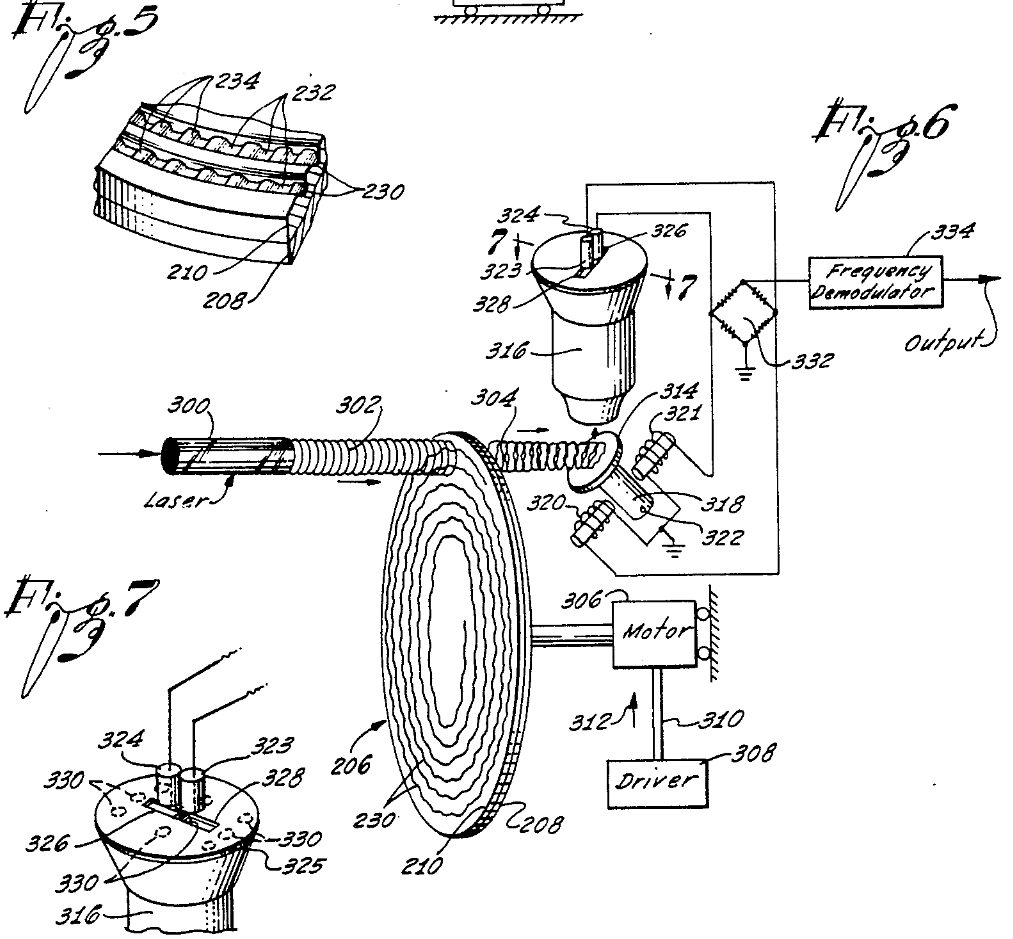
FIGURE 5 is a fragmentary view of a portion of the thermoplastic disc of FIGURE 4.
FIGURE 6 is a block diagram of a reproducing system in accordance with the concepts of the present invention for reproducing information recorded by the system of FIGURE 4.
FIGURE 7 is a view of the surface of the microscope included within the reproducing system of FIGURE 6.

FIGURE 5 shows a fragmentary view of a portion of the thermoplastic disc as recorded by the system of FIGURE 4. It will be noted that the surface of the material 210 contains a plurality of grooves 230 which represent adjacent portions of the spiral track. The grooves 230 contain high areas indicated as 234. The frequency at which the high and low portions appear along the track represents the information. For example, a high frequency may be used to indicate the presence of white in a video signal. Correspondingly, a low frequency may indicate the presence of black in a video signal.

In FIGURE 6 a system is shown for reproducing the information as recorded by the system of FIGURE 4. FIGURE 6 also includes control means to insure a proper tracking of the information recorded on the thermoplastic disc. In FIGURE 6 a light source of energy, for example a laser 300, directs light energy 302 which may be represented as a plurality of wave fronts toward the thermoplastic disc 206. The light energy is all in phase and, therefore, has special coherence. The light energy strikes the surface of the disc 206 and the physical deformities on the surface of the disc produce variations in the characteristics of the light energy as indicated generally at 304. As the light energy is directed toward the disc, the disc is rotated by a motor 306 and moved in a transverse direction 312 by a driver 308 through a shaft 310. Therefore, the light energy 302 produced by the laser 300 tracks the spiral path of information on the disc 206.

The modified light energy 304 is directed toward a mirror 314 to be reflected to one end of a microscope 316. The mirror 314 is attached to a shaft 318. A pair of coils 320 and 321 are disposed relative to the shaft 318 and the shaft, in combination with the coils, is designed to operate as a galvanometer to have the mirror pivot around a point 322. The light energy is magnified by the microscope 316 and appears on the face of the microscope. Two photocells 323 and 324 are arranged over the face of the mircoscope 316 to detect the information.

FIGURE 7 illustrates the photocells disposed relative to the microscope. The face of the microscope includes a screen member 325 which is designed to block off all light except for light which emanates from two slits 326 and 328. The slits 326 and 328 are used to split the information into two components. The information appears behind the screen member 325 on the face of the microscope as a series of dots generally designated as 330. The individual dots pass across the face of the microscope beneath the slits 326 and 328 to be detected by the photocells. The photocells are disposed one over each slit so that each photocell detects a component of the information.

As shown in FIGURE 6, the light energy from each photocell is applied across a bridge network 332. The sum of the two signals from the photocells 320 and 322 is taken at one arm of the bridge network 332 and applied to a frequency demodulator 334. The frequency demodulator produces an output signal having characteristics in accordance with the original information which was recorded on the disc.

The signals from the photocells 323 and 324 are also applied individually to the coils 320 and 321 associated with the shaft 318. The coils are connected to produce opposing forces on the shaft 318. The shaft 318 in combination with the mirror 314 relates around point 322 in accordance with the difference between the signals from the photocells. Therefore, when the output signals from the two photocells are equal, the shaft and mirror are in a central location. This indicates that the energy appearing on the face of the microscope 316 is centrally located. When, however, there are eccentricities in the rotation of the disc 206 the information on the face of the microscope is displaced from the central position. During this condition the output signals from the photocells are unequal to produce a correcting rotation of the shaft 318 and mirror 314 to compensate for these eccentricities in rotation.

As indicated before with reference to FIGURE 3, any variations in the position of the disc 206 closer or further from the laser 300 has no effect on the output information. The reproducing system of the present invention does not depend on the critical slit and stop arrangement of the prior art.

It will be appreciated that the techniques used in the recording and reproducing system of FIGURES 1 through 3 may also be used with a disc medium. Conversely, the techniques used in the recording and reproducing system of FIGURES 4 through 7 may also be used with a tape medium.

It will be appreciated that, although this invention has been illustrated by particular embodiments, it will be apparent ot one skilled in the art that other modifications and adaptions may be made and the invention is, therefore, only to be limited by the appended claims.

What is claimed is:

1. In combination in a system for reproducing information recorded at successive positions on a thermoplastic medium in the form of physical deformities on the surface of the medium, first source means for producing light energy having characteristics of presenting a series of wave fronts with substantially all the energy in each wave front in phase to have light energy with substantial spatial coherence, second means operatively coupled to the medium for moving the medium in a particular direction, the first source disposed relative to the medium for directing the light energy toward the medium as the medium moves in the particular direction to illuminate the successive positions on the medium to provide variations in the characteristics of the light energy in accordance with the physical deformities on the surface of the medium, and third means disposed relative to the medium and responsive to the variations in the characteristics of the light energy to produce an output indication in accordance with the variations in the characteristics of the light energy.

2. In combination in a system for reproducing information recorded at successive positions on a thermoplastic tape in the form of physical deformities on the surface of the tape, first source means for producing light energy having characteristics of presenting a series of wave fronts with substantially all the energy in each wave front in phase to have light energy with substantial spatial coherence, second means operatively coupled to the thermoplastic tape for providing a longitudinal movement of the thermoplastic tape, the first source disposed relative to the tape for directing the light energy produced by the first means toward the tape as the tape moves ot illuminate the successive positions on the tape to provide variations in the characteristics of the light energy in accordance with the physical deformities on the surface of the tape, and third means disposed relative to the tape and responsive to the variations in the characteristics of the light energy to produce an output indication in accordance with variations in the characteristics of the light energy.

3. In combination in a system for reproducing information recorded at successive positions along a spiral track on a thermoplastic disc with the information recorded in the form of physical deformities on the surface of the disc, first source means for producing light energy having characteristics of presenting a series of wave fronts with substantially all the energy in each wave front in phase to have light energy with substantial spatial coherence, second means operatively coupled to the disc for providing a rotational movement of the disc.

the first source disposed relative to the disc for directing the light energy toward the disc as the disc rotates to illuminate the successive positions along the spiral track on the disc to provide variations in the characteristics of the light energy in accordance with physical deformities along the spiral track on the disc, and third means disposed relative to the disc and responsive to the variations in the characteristics of the light energy to produce an output indication in accordance with the variations in the characteristics of the light energy.

4. In combination in a system for reproducing information recorded at successive positions on a thermoplastic medium in the form of physical deformities on the surface of the medium, a laser for producing light energy having spatial coherence, first means operatively coupled to the medium for providing a movement of the medium in a particular direction, the laser disposed relative to the medium for directing the light energy produced by the laser toward the medium as the medium moves in the particular direction to illuminate the successive positions on the medium to provide variations in the characteristics of the light energy in accordance with the physical deformities on the surface of the medium, and second means disposed relative to the medium and responsive to the variations in the characteristics of the light energy to produce an output indication in accordance with the variations in the characteristics of the light energy.

5. In combination in a system for reproducing information recorded at successive positions on a thermoplastic tape with the information recorded in the form of physical deformities on the surface of the tape, a laser for producing light energy having spatial coherence, first means operatively coupled to the thermoplastic tape for providing a movement of the tape in a longitudinal direction, the laser disposed relative to the tape for directing the light energy produced by the laser toward the tape as the tape moves to illuminate the successive positions on the tape to provide variations in the characteristics of the light energy in accordance with the physical deformities on the surface of the medium, and second means disposed relative to the tape and responsive to the variations in the characteristics of the light energy to produce an output indication in accordance with the variations in the characteristics of the light energy.

6. In combination in a system for reproducing information recorded along a spiral track at successive positions on a thermoplastic disc with the information recorded in the form of physical deformities along the track on the disc, a laser for producing light energy having spatial coherence, first means operatively coupled to the disc for providing a rotational movement of the disc, the laser disposed relative to the disc for directing the light energy produced by the laser toward the disc as the disc rotates to illuminate the successive positions along the track on the disc to produce variations in the characteristics of the light energy in accordance with the physical deformities along the track on the disc, and second means disposed relative to the medium and responsive to the variations in the characteristics of the light energy to produce an output indication in accordance with the variations in the characteristics of the light energy.

7. In combination in a system for reproducing information recorded on a digital basis at successive positions on a thermoplastic medium in the form of physical deformities on the surface of the medium, first source means for producing light energy having characteristics of presenting a series of wave fronts with substantially all the energy in each wave front in phase to have light energy with substantial spatial coherence, second means operatively coupled to the medium for providing a movement of the medium in a particular direction, the first source means disposed relative to the medium for directing the light energy toward the medium as the medium moves in the particular direction to illuminate the successive positions on the medium to provide digital variations in the characteristics of the light energy in accordance with the physical deformities on the surface of the medium, third means disposed relative to the medium and responsive to the digital variations in the characteristics of the light energy to produce an output signal having characteristics in accordance with the digital variations in the characteristics of the light energy, and fourth means operatively coupled to the third means and responsive to the output signal for providing an output indication of the information recorded on the medium in accordance with the characteristics of the output signal.

8. In combination in a system for reproducing information recorded on a digital basis at successive positions on a thermoplastic tape in the form of physical deformities on the surface of the tape.

first source means for producing light energy having characteristics of presenting a series of wave fronts with substantially all the energy in each wave front in phase to have light energy with substantial spatial coherence, second means operatively coupled to the tape for providing a movement of the tape in a longitudinal direction, the first source means disposed relative to the tape for directing light energy toward the tape as the tape moves to illuminate the successive positions on the tape to provide digital variations in the characteristics of the light energy in accordance with the physical deformities on the surface of the medium, third means disposed relative to the tape and responsive to the digital variations in the characteristics of the light energy to produce an output signal having characteristics in accordance with the digital variations in the characteristics of the light energy, and fourth means operatively coupled to the third means and responsive to the output signal for providing an output indication of the information recorded on the tape in accordance with the characteristics of the output signal.

9. In combination in a system for reproducing information recorded on a digital basis at successive positions along a spiral track on a thermoplastic disc with the information recorded in the form of physical deformities along the spiral track on the surface of the disc, first source means for producing light energy having characteristics of presenting a series of wave fronts with substantially all the energy in each wave front in phase to have light energy with substantial spatial coherence, second means operatively coupled to the disc for providing a rotational movement of the disc, the first source means disposed relative to the disc for directing the light energy toward the disc as the disc rotates to illuminate the successive positions along the track on the disc to provide digital variations in the characteristics of the light energy in accordance with the physical deformities along the track on the surface of the disc, third means disposed relative to the disc and responsive to the digital variations in the characteristics of the light energy to produce an output signal having characteristics in accordance with the digital variations in the characteristics of the light energy, and fourth means operatively coupled to the third means and responsive to the output signal for providing an output indication of the information recorded along the spiral track on the disc in accordance with the characteristics of the output signal.

10. In combination in a system for reproducing information recorded at successive positions along a track on a thermoplastic medium with the information recorded in the form of physical deformities on the surface of the medium, first source means for producing light energy having characteristics of presenting a series of wave fronts with substantially all the energy in each wave front in phase to have light energy with substantial spatial coherence, second means operatively coupled to the medium for moving the medium in a particular direction, the first source means disposed relative to the medium for directing the light energy toward the medium as the medium moves in the particular direction to illuminate the successive positions along the track on the medium to provide variations in the characteristics of the light energy in accordance with the physical deformities along the track on the surface of the medium, third means disposed relative to the medium and responsive to variations in the relative position between the track on the medium and the light energy directed toward the medium to produce a control signal having values in accordance with such variations, fourth means operatively coupled to the third means and responsive to the control signal for controlling the third means in accordance with the values of the control signal, and fifth means disposed relative to the medium and responsive to the variations in the characteristics of the light energy to produce an output indication in accordance with the variations in the characteristics of the light energy.

11. In combination in a system for reproducing information recorded at successive positions along a track on a thermoplastic medium with the information recorded in the form of physical deformities on the surface of the medium, first source means for producing light energy having characteristics of presenting a series of wave fronts with substantially all the energy in each wave front in phase to have light energy with substantial spatial coherence, second means operatively coupled to the medium for moving the medium in a particular direction, the first source means disposed relative to the medium for directing the light energy toward the medium as the medium moves in the particular direction to strike the successive positions along the track on the medium to provide variations in the characteristics of the light energy in accordance with the physical deformities along the track on the surface of the medium, third means disposed relative to the medium and responsive to the light energy for transmitting the light energy, fourth means disposed relative to the third means and responsive to the light energy transmitted by the third means for splitting the light energy into two components with the two components having equal values with the light energy striking the medium at a central point on the track on the medium, fifth means operatively coupled to the third means and responsive to the difference between the two components of the light energy for displacing the third means relative to the medium to produce equal components of light energy from the fourth means, and sixth means responsive to the sum of the two components of the light energy to produce an output signal in representation of the information recorded on the medium.

12. In combination in a system for reproducing information recorded at successive positions on a thermoplastic medium in the form of physical deformities on the surface of the medium, first source means for producing light energy having characteristics of presenting a series of wave fronts with substantially all the energy in each wave front in phase to have light energy with substantial spatial coherence, second means operatively coupled to the medium for moving the medium in a particular direction, the first source means disposed relative to the medium for directing the light energy toward the medium as the medium moves in the particular direction to strike the successive positions along the track on the medium to provide variations in the characteristics of the light energy in accordance with the physical deformities along the track on the surface of the medium, third means disposed relative to the medium and responsive to the light energy and including a first surface with the third means magnifying the light energy to present an optical representation of the light energy on the first surface of the third means with the optical representation having characteristics in accordance with the characteristics of the light energy, and fourth means disposed relative to the first surface of the third means and responsive to the optical representation of the light energy for producing an output signal having characteristics in accordance with the characteristics of the optical representation.

13. The combination of claim 12 wherein the first source means is a laser.

14. The combination of claim 12 additionally including a fifth means disposed relative to the third means and the medium for transferring the light energy modified by the physical deformities on the surface of the medium to the third means.

15. The combination of claim 14 additionally including a sixth means located on the first surface of the third means for splitting the optical representation of the light energy into two components with the two components having equal intensities when the light energy strikes the medium at a central position along the track on the medium and wherein the physical displacement of a fifth means is controlled in accordance with the difference between the two components to equalize the two components.

References Cited by the Examiner

UNITED STATES PATENTS

| | | | |
|---|---|---|---|
| 2,393,631 | 1/1946 | Harrison et al. | 250—219 |
| 2,881,416 | 4/1959 | Hosken | 250—219 |
| 2,916,632 | 12/1959 | Petterson | 250—219 |
| 2,941,088 | 6/1960 | Mahaney | 250—233 |
| 3,044,358 | 7/1962 | Glenn | 88—61 |

OTHER REFERENCES

Mutulka, "Application of Lasers to Digital Communications," IRE Transactions on Aerospace and Navigational Electronics, June 1962, pp. 102–109.

Overhultz et al., "Laser Doppler Radar," IBM Technical Disclosure Bulletin, August 1962, pp. 57 and 58.

RALPH G. NILSON, *Primary Examiner.*

ARCHIE R. BORCHELT, *Examiner.*

E. STRICKLAND, M. ABRAMSON, *Assistant Examiners.*